(12) United States Patent
Sweazy

(10) Patent No.: US 6,478,144 B1
(45) Date of Patent: Nov. 12, 2002

(54) SLIDING SHOE SORTER AND METHODS OF USING SLIDING SHOE SORTER

(75) Inventor: Eric Sweazy, Danville, KY (US)

(73) Assignee: FKI Industries, Inc.'s, FKI Logistex Automation Division, Danville, KY (US)

( * ) Notice: Subject to any disclaimer, the term of this patent is extended or adjusted under 35 U.S.C. 154(b) by 0 days.

(21) Appl. No.: 09/666,321

(22) Filed: Sep. 21, 2000

(51) Int. Cl.⁷ .............................................. B65G 47/10
(52) U.S. Cl. .................................. 198/890; 198/370.02
(58) Field of Search ............................. 198/370.02, 890

(56) References Cited

U.S. PATENT DOCUMENTS

| | | | | |
|---|---|---|---|---|
| 3,361,247 A | * | 1/1968 | Lauzon et al. | 198/370.02 |
| 4,717,011 A | * | 1/1988 | Yu et al. | 198/370.02 |
| 4,732,259 A | * | 3/1988 | Yu et al. | 198/370.02 |
| 4,732,260 A | * | 3/1988 | Canziani | 198/370.02 |
| 5,131,522 A | * | 7/1992 | Fujio | 198/370.02 |
| 5,135,100 A | * | 8/1992 | Cotter et al. | 198/370.02 |
| 5,217,105 A | | 6/1993 | Sapp et al. | |
| 5,285,886 A | * | 2/1994 | Ostholt et al. | 198/370.02 |
| 5,333,715 A | | 8/1994 | Sapp | |
| 5,427,223 A | * | 6/1995 | van den Goor | 198/370.02 |
| 5,613,591 A | * | 3/1997 | Heit et al. | 198/370.02 |

* cited by examiner

Primary Examiner—Joseph E. Valenza
(74) Attorney, Agent, or Firm—Kenneth F. Pearce

(57) ABSTRACT

The present invention relates to sliding shoe sorters and methods of using those sorters. One or more pluralities of the shoes are interposed between the conveyors lateral edges and can be orderly advanced in lines. Controllers activate or deactivate the diverters which direct the sliding shoes toward one or more receivers, and the diversion of the shoes can result in the egressing of an item away from the conveyer. The receivers can be provided with rediverters to redirect the shoes toward the interposed sliding shoes. Items advanced by the conveyor may have a code placed about them, and after a code has been placed about the item to be sorted, a paradigm or paradigms responsive to the code can be created to orchestrate activation or deactivation of the diverters and/or the rediverters.

22 Claims, 14 Drawing Sheets

SLIDING SHOE SORTER AND METHODS OF USING SLIDING SHOE SORTER

BACKGROUND OF THE INVENTION

1. Field of the Invention

The subject matter of the present invention relates to sliding shoe sorters and methods of using those sorters. Embodiments of the present invention can be utilized to sort any type of item regardless of its composition, size, container or shape. Novel structures and steps for monitoring or tracking the items as well as actually sorting the items are within the ambit of the current invention, e.g., a plurality or pluralities of shoes, rods, shafts, pushers or the like are interposed between the sorter's conveyor's lateral edges. Importantly, the shoe can be anything which moves about the conveyor that is capable of pushing items toward the edge of the conveyor.

One or more pluralities of the shoes which have been interposed between the conveyor's lateral edges can be ordered and advanced in lines. Representative lines can include mechanical, electromechanical, electrical, electronic or electrical field tracks. Controllers activate or deactivate the diverters which direct the sliding shoes toward one or more receivers, i.e., mechanical, electromechanical, electrical, electronic or electrical field lines. Diversion of the shoes can result in the egressing of an item away from the conveyer. The receivers can be provided with rediverters to redirect the shoes toward the interposed sliding shoes.

Items advanced by the conveyor may have a code placed about them. Types of coding can include radio frequency identification, bar coding, color coding or light coding. After a code has been placed about the item to be sorted, a paradigm or paradigms responsive to the code can be created to orchestrate activation or deactivation of the diverters and/or the rediverters. The requisite logic, sensors and controllers necessary to control the diverters can be incorporated into the various paradigms. As a result, dependent upon the items to be sorted, the nature and scope of paradigms operable in accordance with the present invention is virtually unlimited.

Unlike the prior art, embodiments of the present invention interpose one or two pluralities of shoes between the receivers. When a single plurality of shoes is interposed, the diverter can direct shoes toward either the left receiver or the right receiver or both which enables two distinct rows of items to be advanced and sorted. Within the scope of this embodiment, alternating or simultaneous diversion of the shoes toward either receiver can be accomplished. And in accordance with another feature of the present invention, along with the conventional front loading of the conveyor associated with sliding shoe sorters, items can be laterally ingressed directly onto the conveyor, i.e., items can be induced onto the conveyor at two or more locations.

2. Description of the Previous Art a) U.S. Pat. No. 5,217,105-Sapp, et. al., also owned by the current assignee of the present invention enables a novel switching system for sorters. The '105 Patent further discloses a conveying mechanism incorporating the traditional teachings for tracks, crossovers and pushers. Sapp, et. al, is silent regarding the use of a medially interposed primary track or tracks.

b) U.S. Pat. No. 5,333,715-Sapp owned by the current assignee of the present invention also enables a novel switching system for sorters. And in a vein similar to U.S. Pat. No. 5,217,105, the '715 Patent teaches what has been the traditional conveying mechanism for conveyors, including the tracks, crossovers and pushers. As with the '105 Patent, this Patent is also silent with respect to the use of an interposed primary track or tracks.

SUMMARY OF THE INVENTION

Typically, the currently available sliding shoe sorters require justification of the majority of shoes in a single row to either the right or left of sorter's center. Specifically, the prior art teaches the justification of shoes near either the right or left border of the sorter's conveyor bed. In operation, shoes which have been justified to the right will slide leftward to divert goods off of the left side of the conveyor slats or tubes. Conversely, shoes justified to the left will slide rightward to divert goods off the right side of the conveyor slats, tubes, etcetera, making up the conveyor bed.

Operation of prior art sliding shoe sorters mandates front end loading of the sorter. Cases to be sorted are bar coded, then singulated and tracked by currently available bar code sensors operable, in conjunction, with their respective computer programs. After the cases are front loaded in single file onto the sliding shoe sorter, dedicated computer programs activate select shoes to crossover from one side of the conveyor to the opposite side of the conveyor bed. Thus, dependent upon the carton's bar code, the computer program will activate shoes to divert the case to the appropriate spur conveyor, chute or other destination.

It has been determined that when operating in the most optimal environment and upon the most appropriately sized and spaced cases, physical characteristics of prior art sorters limit their capacity to about 200 diverted cases per minute. Practice of either the device or method embodiments or both of the present invention can virtually double the number of cartons per minute which can be sorted. Moreover, since less tangible components are required, it is believed that the unique structure and steps of the present invention will reduce the expense associated in construction and/or maintenance of sorting systems while concurrently increasing the volume of items which can be sorted.

As enabled in U.S. Pat. Nos. 5,217,705 and 5,333,715, those skilled the art will readily recognize some of the types of currently available bases for supporting the sorter as well as selected drives for advancing the conveyor's slats and shoes. Generally, the conveyors of the present invention advance in a circularly continuous pathway. A plurality of or pluralities of shoes, rods, shafts, pushers or the like which can be diverted are interposed between the sorter's conveyor's lateral edges. And as previously set forth, shoes can be orderly interposed mechanically, electromechanically, electrically, electronically or in linear electrical fields. Further, those skilled in the art recognize that the shoes or pushers are not limited to any particular configuration, but can include any device capable moving about the conveyor and pushing the item to be sorted.

Within the scope of the present invention, embodiments can monitor items to be sorted and can signal controllers to activate or deactivate the diverters and rediverters. Any kind of controller capable of activating or deactivating the diverters and rediverters can be incorporated into the present invention. Activation of the diverters directs the shoes toward one or more receivers which may cause an item to egress from the conveyor. Conversely, activation of the receiver's rediverter will redirect the shoes toward the interposed plurality. This novel feature allows shoes to perform more than one sort per conveying cycle.

In accordance with the present invention, one or more diverters and one or more rediverters can be utilized to direct or redirect the shoes. Diverters and rediverters can include mechanical, electronic, electrical or electromechanical switches, electrical fields, or any other structure which can cause a shoe or shoes to be directed from the interposed plurality toward a receiver, or from a receiver toward the interposed plurality of shoes.

According to any of the plethora of possible paradigms, direction and timing of the diversion of the shoe or shoes is predetermined. Operable paradigms can include sensors, controllers and their respective logics, as well as computer programs utilized, in association, with bar coding, color coding, light coding, radio frequency identification coding, or any combinations thereof. However, paradigms can be something as simple as human activation of the shoes dependent upon color coding of the items to be sorted.

Unlike currently available sliding shoe sorters, certain embodiments of the present invention interpose or medially interpose one or two pluralities of shoes or the like between the lateral edges of the conveyor, or between receivers. Select configurations allow the diverter to direct shoes toward a left or right receiver or both while other configurations provide for diversion of shoes from a first plurality of shoes toward a first receiver and from a second plurality of shoes toward a second receiver. Importantly, bidirectional diversion toward either side of the sorter increases the volume of items which can be sorted, since these particular configurations create the ability to advance two distinct lines of items to be sorted rather than the traditional single file sortation mandated by the prior sliding shoe sorters. Moreover, as previously submitted, either the first or the second receiver or both can be supplied with rediverters to redirect the shoes toward their respective interposed pluralities. And dependent upon the item to be egressed, the shoes can be diverted singularly or in series.

Traditional sliding shoe sorters have been consigned to monitoring the bar coded items to be sorted, before they are front end loaded onto the conveyor. The present invention's controllers and predetermined logics can utilize front end monitoring of the codes for activation or deactivation of the shoes. However, whether or not the present sorter and its methods of use are utilized, in combination, with front end sensors, it has unexpectedly been determined that locating one or more tracking sensors proximate to conveyor enhances the sliding shoe sorter's monitoring efficiencies as well as the sorter's sorting capacity. Thus, within the scope of the present invention, lateral ingress of items onto the conveyor is possible.

An object of the present invention is to increase the cost effectiveness of currently available sliding shoe sorters by incorporating the inventions disclosed herein in the structures and methods of previously existing sliding shoe slot sorters.

It is another object of the present invention to effectively double the volume of items which can be sorted over the volumes that can be sorted by currently available sliding shoe sorters.

Still another object of the present invention is reduce maintenance costs associated with sliding shoe sorters by reducing the sortation equipment components required.

Yet another object of the present invention is to reduce noise attributed to sliding shoe sorters through reducing the sortation equipment components required.

It is yet another object of the present invention to more cost effectively manage power consumption of sliding shoe sorters through reducing the sortation equipment components required.

Still another object of the present invention is to reduce engineering time attributed to designing and configuring sliding shoe slot sorters through reducing the sortation equipment components required.

Yet another object of the present invention is to reduce manufacturing and set up time associated with sliding shoe slot sorters through reducing the sortation equipment components required.

It is yet another object of the present invention to improve efficiencies of sliding shoe sorters.

One embodiment of the present invention can be described as a sorter, comprising: a base; a conveyor having a first edge and a second edge; a drive; a plurality of shoes medially interposed between the first and second edges; a diverter; a receiver proximate to one of the edges; and a controller.

Another embodiment of the present invention can be described as a sorter, comprising: a base; a conveyor having a first edge and a second edge; a drive; a first receiver proximate to the first edge; a second receiver proximate to the second edge; a plurality of shoes interposed between the first receiver and the second receiver; a diverter; and a controller.

In another embodiment, the present invention can be described as a sorter, comprising: a base; a conveyor having a first and a second edge; a drive; a plurality of shoes positioned near the first edge; a receiver positioned near the second edge; a diverter; a lateral ingress; and a controller.

Yet another embodiment, of the present invention, can be described as a sorter, comprising: a base; a conveyor having a first edge and a second edge; a drive; a first receiver near the first edge and a second receiver near the second edge; a first plurality of shoes interposed between the first receiver and the second receiver outlining a first path; a second plurality of shoes positioned between the first plurality of shoes and the second receiver outlining a second path; a first diverter and a second diverter; and a first controller and a second controller.

Yet still another embodiment, of the present invention, can be described as a method of sorting a plurality of items, comprising the steps of: interposing and medially ordering a plurality of shoes between a first and a second edge of a conveyor; frontally transferring one or more of the items to be sorted to said conveyor; advancing one or more of items, the conveyor and the shoes; monitoring one or more of the items to be sorted; and activating a diverter to direct one or more of the shoes toward a receiver.

In another embodiment, the present invention can be described as a method of sorting a plurality of items, comprising the steps of: ordering a plurality of shoes between a first receiver and a second receiver; transferring one or more items to be sorted to a conveyor; advancing one or more of the items, the conveyor and the shoes; monitoring one or more of the items to be sorted; and activating a diverter to cause one or more of the shoes to be directed to either the first receiver or the second receiver or both.

In yet another embodiment, the present invention can be described as a method of sorting a plurality of items, comprising the steps of: ordering a plurality of shoes proximate a first edge of a conveyor and a receiver proximate to a second edge of said conveyor; frontally transferring one or more of the items to be sorted to said conveyor; advancing one or more of the items, the conveyor and the shoes;

ingressing laterally one or more of the items to be sorted onto said conveyor; monitoring one or more of the items to be sorted; and activating a diverter to cause one or more of the shoes to be directed toward the receiver.

In still another embodiment, the present invention can be described as a method of sorting a plurality of items, comprising the steps of: ordering a first plurality of shoes and a second plurality of shoes between a first receiver and a second receiver; transferring one or more of the items to be sorted to a conveyor; advancing one or more of the items, the conveyor and the shoes; monitoring one or more of the items to be sorted; and activating a first diverter to cause one or more of the shoes to be directed toward the first receiver or a second diverter to cause one or more of the shoes to be directed toward the second receiver or both.

It is the novel and unique interaction of these simple elements and steps that creates the sliding shoe sorters and the methods of using the sorters, within the ambit of the present invention. Pursuant to Title 35 of the United States Code, descriptions of preferred embodiments follow. However, it is to be understood that the best mode descriptions do not limit the scope of the present invention. The breadth of the present invention is identified in the claims appended hereto.

DESCRIPTION OF THE PREFERRED EMBODIMENTS

Although the disclosure hereof is detailed to enable those skilled in the art to practice the invention, the embodiments published herein merely exemplify the present invention which can be practiced in other specific structures and methods.

Figure 1:
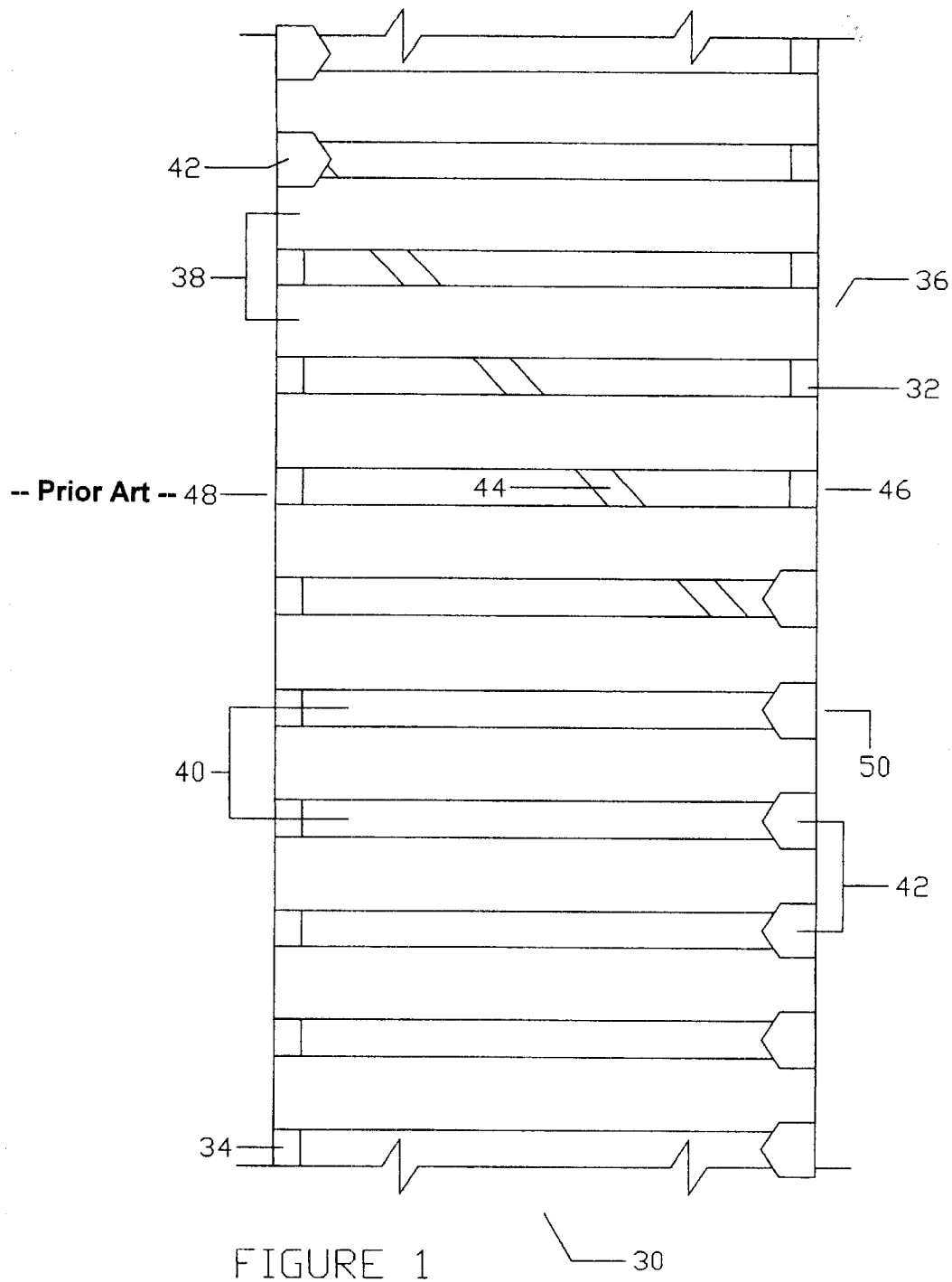
FIG. 1 is plan view of previously available sliding shoe sorters.

FIG. 1 is a representation of presently available sliding shoe sorters. In this particular view, sliding shoe sorter (30) has a primary and first mechanical track (32) justified rightward and a second mechanical receiving track (34) justified leftward. The majority of shoes (42) is ordered in primary track (32). Sorter (30) further includes conveyor (36) having slats (38) with slots (40) between slats (38). Extending through slots (40) are the tops or heads of shoes (42). Positioned below slats (38) is crossover track (44), in plane, with primary and first track (32) and second track (34).

First track (32) is justified proximate to first edge (46) of conveyor (36) and second track (34) is justified near second edge (48) of conveyor (36). Activation of a switch (not shown) but located at about (50), directs shoes (42) from primary track (32) via crossover track (44) to second track (30). Before the conveyor bed completes a cycle, shoes traveling in second track (30) are rejustified, for example, by a plow (not shown), back to first track (32).

Those skilled in the art comprehend that first track (32) is justified either to the right or left side of the sliding shoe sorter. Therefore, if primary track (32) is justified to the right, cartons will be pushed off the conveyor bed to the left, and if first track (32) is justified to the left, cartons will be pushed off the conveyor bed to the right. Configurations of second track (34) and crossover track (44) are dependent upon the arrangement of primary and first mechanical track (32).

Figure 2:
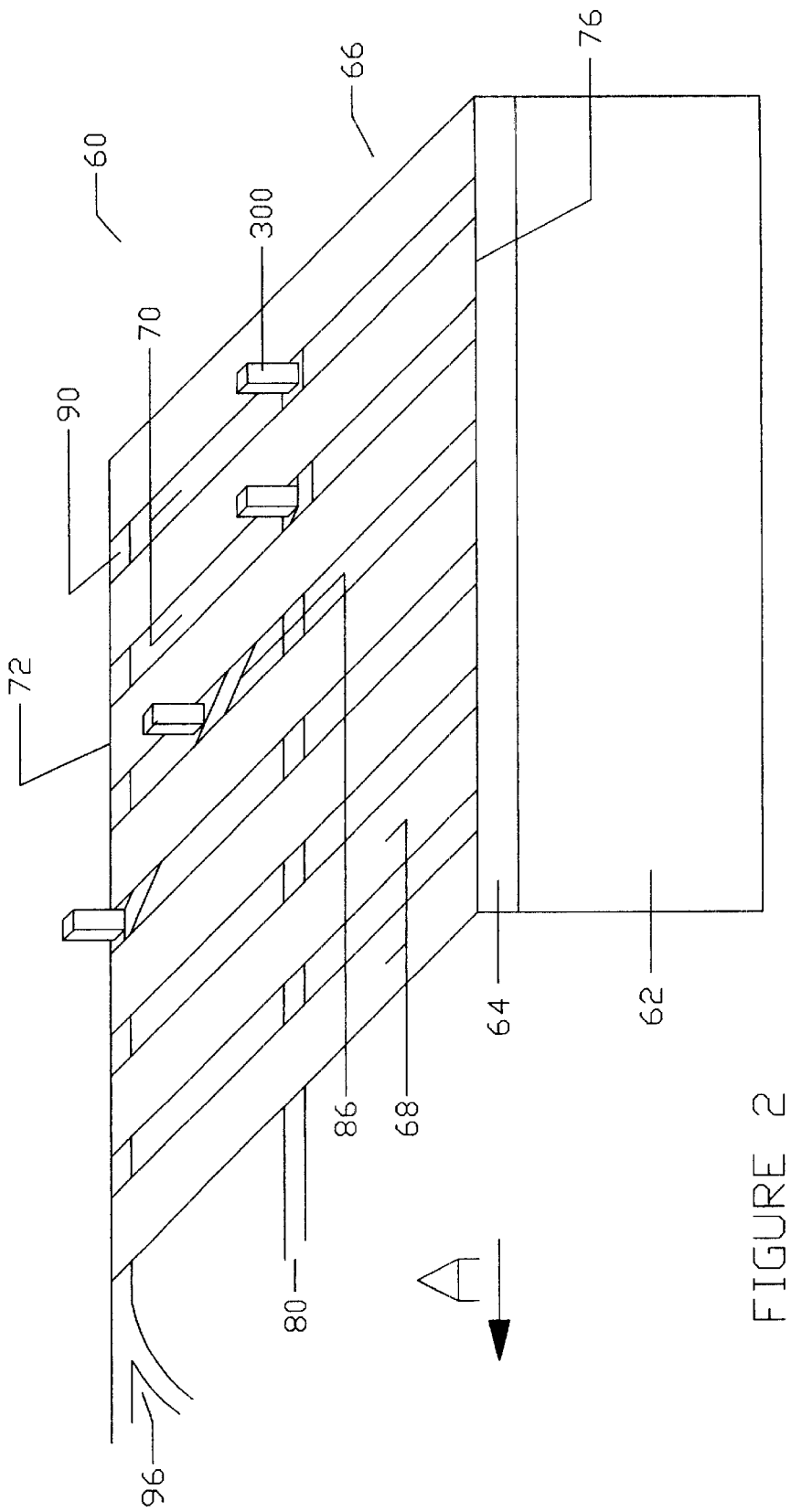
FIG. 2 is a pictorial side view of the conveyor demonstrating the medially interposed shoes.
Figure 6:
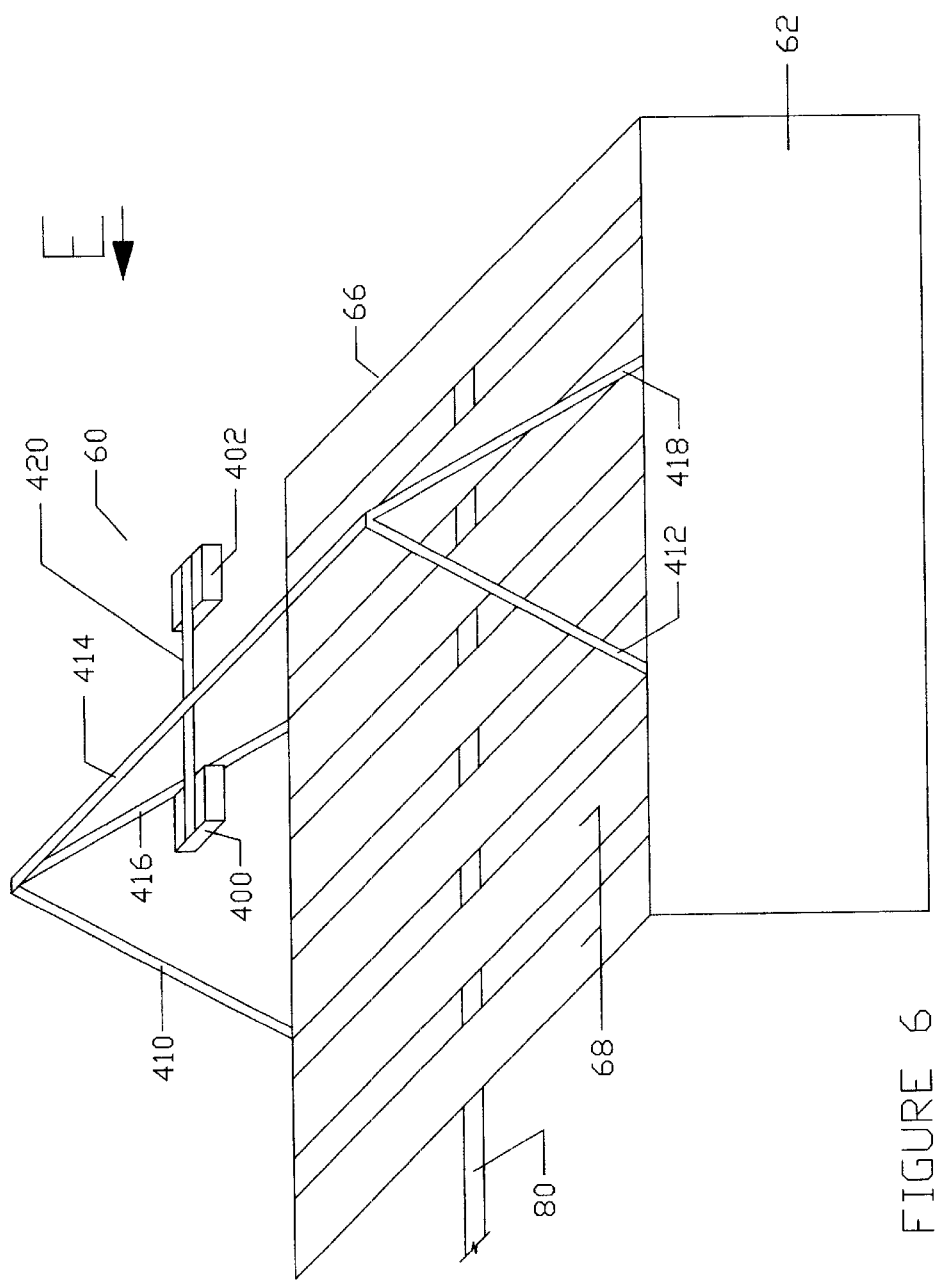
FIG. 6 is a pictorial side view of the conveyor that shows a novel placement of the sensor or sensors.

For ease of illustration, mechanical tracks for ordering and/or linearly aligning shoes (300) are pictorially displayed in FIGS. 1, 2 and 6. However, those skilled in the art recognize the present sorters and methods enabled herein can also order shoes (300) in other ways, e.g., electric fields. Thus, the present invention is no way limited to the novel sorter and methods incorporating only mechanical or electromechanical tracks or the numerous components thereof for those kinds of tracks.

In FIG. 2, an embodiment of the present invention is laterally pictured. Sliding shoe sorter (60) includes base (62) and drive (64) for advancing conveyor (66) in direction of arrow A. Commonly owned U.S. Pat. Nos. 5,217,705 and 5,333,715 enable sorter bases, drives, as well as, select types of switches. By reference, those Patents are incorporated herein.

In this specific embodiment, conveyor (66) includes slats (68), slots (70) between slats (68), first edge (72) and second edge (76). Interposed or medially interposed track (80) is positioned between first edge (72) and second edge (76). And depending upon engineering parameters, interposed track (80) can be equidistantly spaced between first edge (72) and second edge (76).

As represented in FIG. 2, conveyor (66) is advanced in the direction of Arrow A. The plurality of shoes (300) is ordered and/or aligned in interposed track (80). Shoes, shafts or rods (300) can be attached to interposed track (80) in any manner acceptable in the art, which can include, for example, a cam follower bearing (not shown). Additionally, those skilled in the art recognize that conveyor (66) can utilize something other than slats (68) for advancing and supporting the items to be sorted.

Depending upon any of the plethora of the possible predetermined logics and/or paradigms, when diverter (86) is activated, one or a series of shoes (300) is directed toward receiver (90). Diversion of shoes (300) can cause an item to egress laterally from conveyor (66). Proximate to the egress (not shown), slats (68) can be angled to assist the egressing of the item away from conveyor (66). Those skilled in the art comprehend that one or more diverters (86) can be positioned about interposed track (80). Importantly and within the scope of the present invention, sorter (60) is fully operable when multiple lateral egresses are provided for moving items away from conveyor (66).

With a view still toward FIG. 2, after diversion, shoes (300) are directed from interposed track (80) to receiver (90) via any method acceptable in the art. Modes of ordering the cross over or the guiding of shoes (300) from interposed track (80) to receiver (90) can include mechanical, electromechanical or electrical lines, as well as induced electrical field pathways. And as will be subsequently disclosed more fully, receiver (90) can be supplied with a rediverter for redirecting shoes, shafts, rods or the like (300) toward interposed track (80). Importantly, within the ambit of the present invention, diverters and rediverters can include, for example, mechanical, electromechanical or electronic switches, or other structures those skilled in the art recognize to cause diversion of shoes (300). Before diverted shoes (300) complete their conveying cycle, return (96), e.g., a plow, can assist in repositioning shoes (300) in the medially interposed or interposed track (80).

Figure 3:
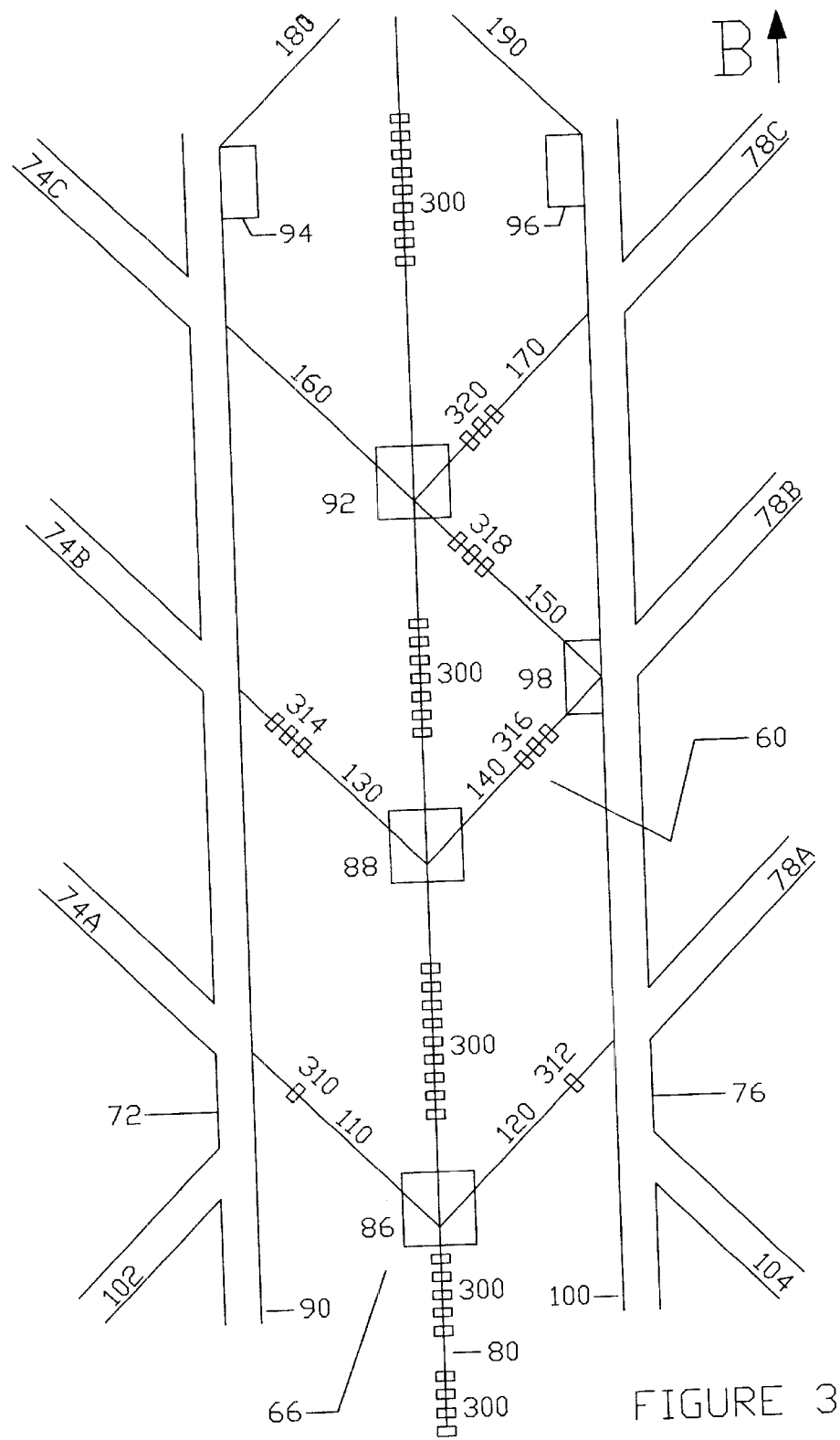
FIG. 3 is a plan view of a sorter which shows the interposed plurality of shoes and two receivers.

Turning toward FIG. 3, another embodiment of the present invention is portrayed. Conveyor (66) of sorter (60) advances in direction of Arrow B. Proximate to first edge (72) of conveyor (66) are egress (74A), (74B), (74C) and ingress (102), and near second edge (76) of conveyor (66) are egresses (78A), (78B), (78C) and ingress (104). Egresses can lead to any mode of off loading, including spur conveyors or other types of offshoots. In conjunction with the traditional front end loading of conveyor (66), ingress (102) and ingress (104) can provide alternate on loading of conveyor (66) from any other source, including conveyors or hand loading. Further, those skilled in the art comprehend the total number of ingresses are limited only by time and space considerations, for this embodiment, as well as for other embodiments enabled herein.

As shown in FIG. 3, along pathway (80), a plurality of shoes (300) is interposed between first receiver (90) and second receiver (100). In this particular embodiment shoes (300) can be interposed or medially interposed in path (80) between first receiver (90) and second receiver (100), or shoes, shafts, rods or the like (300) can be equidistantly spaced among: first receiver (90) and second receiver (100), first edge (72) and second edge (76) of conveyor (66), first receiver (90) and second edge (76) of conveyor (66), or second receiver (100) and first edge (72) of conveyor (66).

Until diversion of a shoe or shoes, the plurality of shoes (300) is advanced forward, and before completion of the advancing shoe cycle, return (94) will redirect shoes diverted to first receiver (90) back to the interposed plurality (80) while return (96) will redirect shoes diverted to second receiver (100) back to path (80). Cross over (180) returns shoes (300) from first receiver (90) back to the interposed plurality (80) while cross over (190) carries shoes (300) from second receiver (100) back to interposed pathway (80). It is to be noted that those skilled in the art comprehend there are other modes for returning shoes (300) to the interposed plurality (80).

In accordance with the present invention, embodiments are not limited to a single pass sort per shoe cycle. Further, with this specific embodiment, two distinct rows of side by side items to be sorted can be advanced and sorted. Importantly, the sortation of the two rows of items can be alternating or simultaneous. And as previously set forth, also within the scope of the present inventions, methodology and engineering configurations, are only limited by cost, time and space requirements. Thus, the items to be sorted, the code applied about the items, their respective predetermined logics and/or paradigms, and the quantity egresses and ingresses are virtually unlimited.

In the particular embodiment set forth in FIG. 3, alternative shoe and serial shoe diversions are employed. By way of illustration, during the conveyor cycle, simultaneously or separately:

diverter (86) directs shoe (310) toward first receiver (90) via cross over (110) and shoe (312) toward second receiver (100) via cross over (120);

diverter (88) directs a series of shoes (314) toward first receiver (90) via cross over (130) and a series of shoes (316) toward second receiver via cross over (140);

rediverter (98) directs a series of shoes (318) via cross over (150) toward interposed plurality (80); and/or diverter (92) directs a series of shoes (320) via cross over (170) toward second receiver (100).

Figure 4:
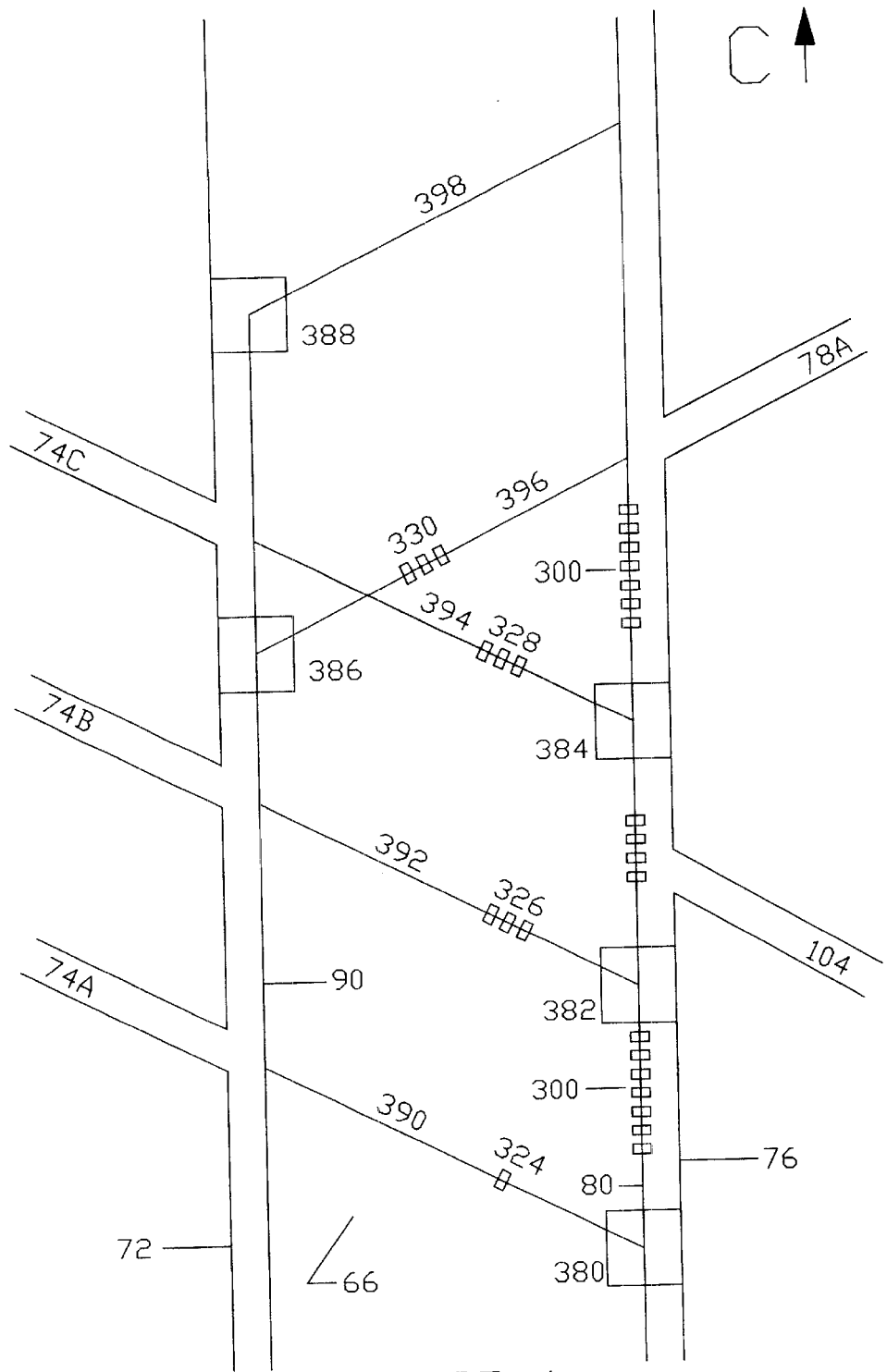
FIG. 4 is a top view of a sorter which has a rightward justified plurality of shoes, a leftward receiver and rightward ingress.

Turning now to FIG. 4, another embodiment of the present invention is portrayed. Conveyor (66) of sorter (60) advances in the direction of Arrow C. First edge (72) of conveyor (66) has egresses (74A), (74B), and (74C) and second edge (76) has egress (78A) and ingress (104). As with other embodiments of the present invention, depending upon the predetermined logics and/or paradigms, egresses (74A), (74B), (74C) and (78A) can lead to any mode of off loading, including spur conveyors or other types of offshoots, and along with traditionally front loading of conveyor (66), ingress (104) allows lateral onloading.

The plurality of shoes (300) is justified rightward in primary pathway (80) and receiver (90) is justified leftward proximate to edge (72) of conveyor (66). Primary path (80) is supplied with diverters (380), (382) and (384) while receiver (90) is provided with rediverter (386). Return (388) directs shoes that have been diverted to receiver (90) back to plurality of shoes (80) via pathway (398).

In the particular embodiment set forth in FIG. 4, alternative shoe and serial shoe diversions are employed. By way of illustration, during the conveyor cycle, simultaneously or separately:

diverter (380) directs shoe (324) toward receiver (90) via cross over (390);

diverter (382) directs a series of shoes (326) toward receiver (90) via cross over (392);

diverter (384) directs a series of shoes (328) via cross over (394) toward receiver (100); and/or rediverter (386) directs a series of shoes (330) via cross over (396) toward primary path (80).

Figure 5:
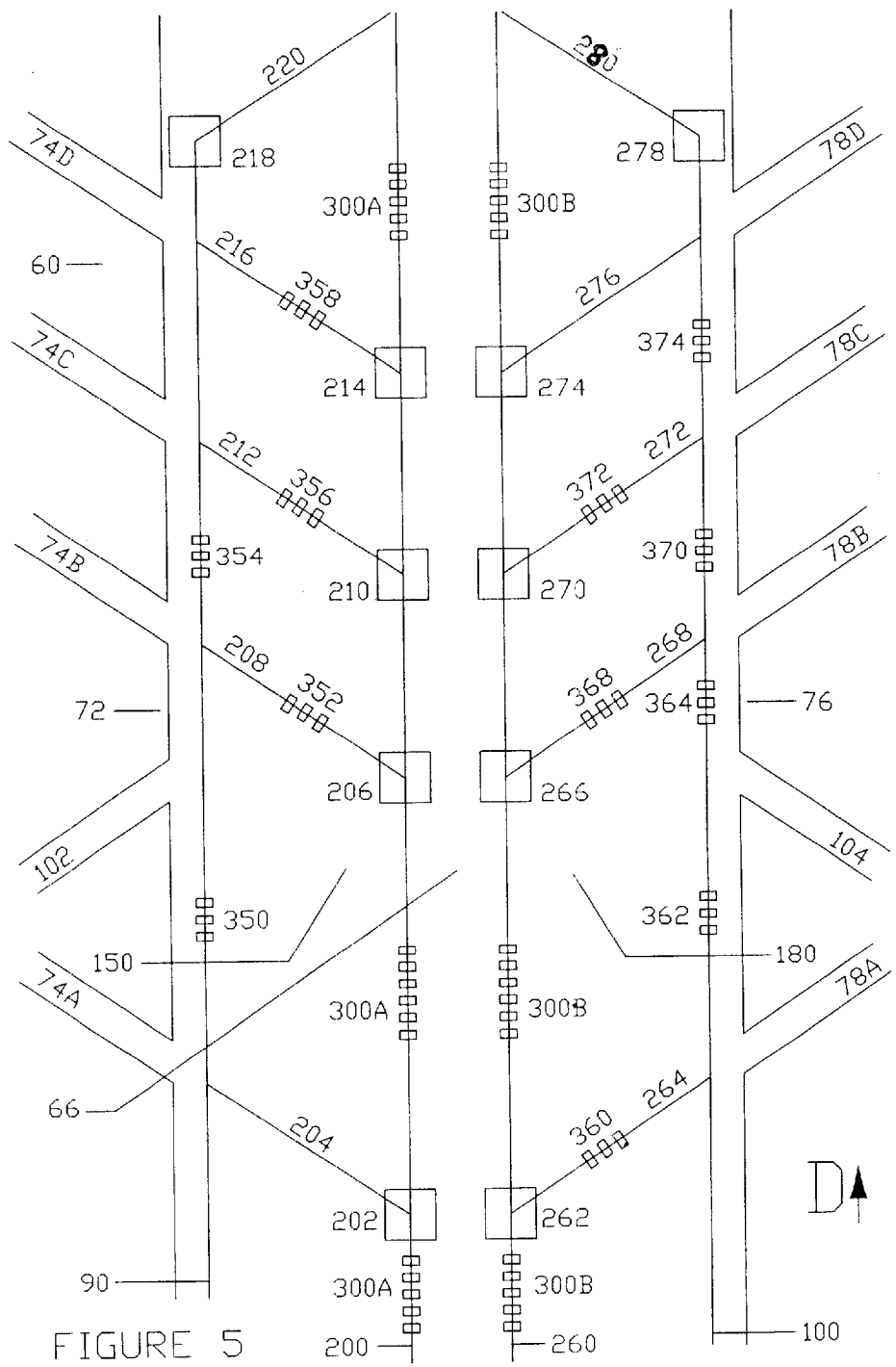
FIG. 5 is a plan view of a sorter which shows two interposed pluralities of shoes and two receivers.

Viewing FIG. 5, another embodiment of the present invention is portrayed. Conveyor (66) of sorter (60)

advances in the direction of Arrow D. First edge (72) of conveyor (66) has egresses (74A), (74B), (74C), (74D) and ingress (102), and second edge (76) has egresses (78A), (78B), (78C), (78D) and ingress (104). As with other embodiments of the present invention, depending upon the predetermined logics and or paradigms, egresses (74A), (74B), (74C), (74D), (78A), (78B), (78c) and (78D) can lead to any mode of off loading, including spur conveyors or other types of offshoots. In conjunction with the traditional front end loading of conveyor (66), ingress (102) and ingress (104) can provide alternate on loading from any other source, including conveyors, shoots or hand loading. And depending upon site dominated engineering parameters, those skilled in the art will recognize that either first edge (72) or second edge (76) need not be provided with ingress (102) and/or (104). Alternatively, either first edge (72) or second edge (76), or both can include more than one ingress.

In this specific embodiment, first pathway (200) orders plurality of shoes (300A) while second pathway (260) orders advancement of plurality of shoes (300B). First receiver (90) runs proximate first edge (72) and second receiver (100) runs near second edge (76). Both first path (200) and second path (260) are interposed between first receiver (90) and second receiver (100).

First plurality of shoes path (200), shoes (300A), first receiver (90), cross overs (204), (208), (212), (216), (220), diverters (202), (206), (210), (214) and return (218) embody first side (150) of conveyor (66). Second plurality of shoes path (260), shoes (300B), second receiver (100), cross overs (264), (268), (272), (276), (280), diverters (262), (266), (270), (274) and return (278) encompass a second side (180) of conveyor (66). In operation, after items have been singulated, this particular embodiment can advance a line of items (not shown) along the first side (150) of conveyor (66) in a first path and another line of items along the second side (180) of conveyor (66) in a second path.

As exemplified in FIG. 5, shoes (300A) ordered in first pathway (200) and shoes (300B) ordered in second pathway (260) are respectively serially diverted off either first pathway (200) or second pathway (260). However, those skilled in the art comprehend that a single shoe rather than a series of shoes can also be diverted off of their respective paths. And although not shown in FIG. 5, it is understood that either first receiver or second receiver or both can be supplied with rediverters for redirecting shoes toward their respective pluralities. In portrayed embodiment, with regard to first side (150) of conveyor (66) and its corresponding first path, series of shoes (300A) is diverted as follows:

shoes (350) travel along first receiver (90), after their diversion over cross over (204) by diverter (202);

diverter (206) directs shoes (352) toward first receiver (90) via cross over (208);

shoes (354) travel along first corresponding track (90), after their diversion over cross over (208) by diverter (206);

diverter (210) directs shoes (356) toward first receiver (90) via cross over (212); and diverter (214) directs shoes (358) toward first receiver (90) via cross over (216).

With a view still toward FIG. 5 and directed specifically at second side (180) of conveyor (66) and its corresponding second path, at the same time as shoes (300A) are diverted, series of shoes (300B) is diverted as follows:

diverter (262) directs shoes (360) toward second receiver (100) via cross over (264);

shoes (362) and (364) travel along second receiver (100), after their diversion over cross over (264) by diverter (262);

diverter (266) directs shoes (368) toward second receiver via cross over (268) and shoes (370) travel along second receiver (100), after their diversion over cross over (268) by diverter (266); and diverter (270) directs shoes (372) toward second receiver via cross over (272), and shoes (374) travel along second receiver track (100), after their diversion over cross over (272) by diverter (270).

With a view toward FIG. 6, an embodiment employing multiple monitoring or tracking sensors proximate to primary pathway (80) is depicted. As disclosed, rods (410) and (416) are attached to each other at a common junction and to base (62) of sliding shoe slot sorter (60) at opposite points, thereby forming a triangular shape. Conversely, rods (412) and (418) are similarly adjoined and also create a common junction with the triangular design. Rod (414) runs above conveyor (66) and is attached at the common junctions of rods (410), (416), (412) and (418). Bar (420) is attached to and supports first sensor (400) and second sensor (402) near conveyor (66) advancing the items to be sorted in the direction of Arrow E. Those skilled in the art comprehend that one or more sensors can be arranged proximate to conveyor (66) in many other ways.

Having exemplified the structures of the inventions above and in view of the disclosure already presented, attention is now directed to the steps of practicing Applicant's invention. Within the scope of the present inventions, selected steps enabling the practice of the various methods are set forth in FIGS. 7–20. And for ease of illustration as well as simplicity of understanding, those Figures and steps set forth therein are incorporated herein by referenced.

In general, the steps of Applicant's methods of practicing his invention can be categorized as indicated below.

Figure 7:
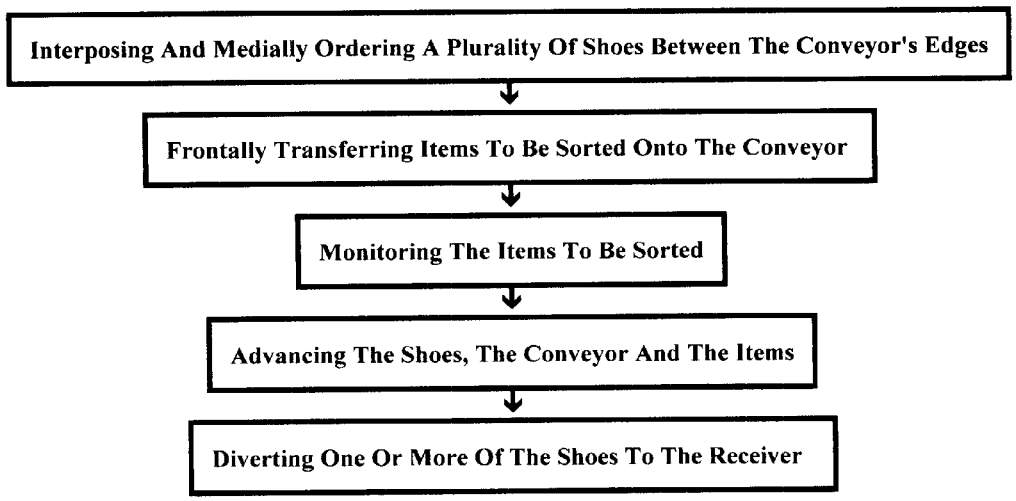
FIG. 7 is a diagrammatic representation of one of the methods of the present invention.
Figure 8:
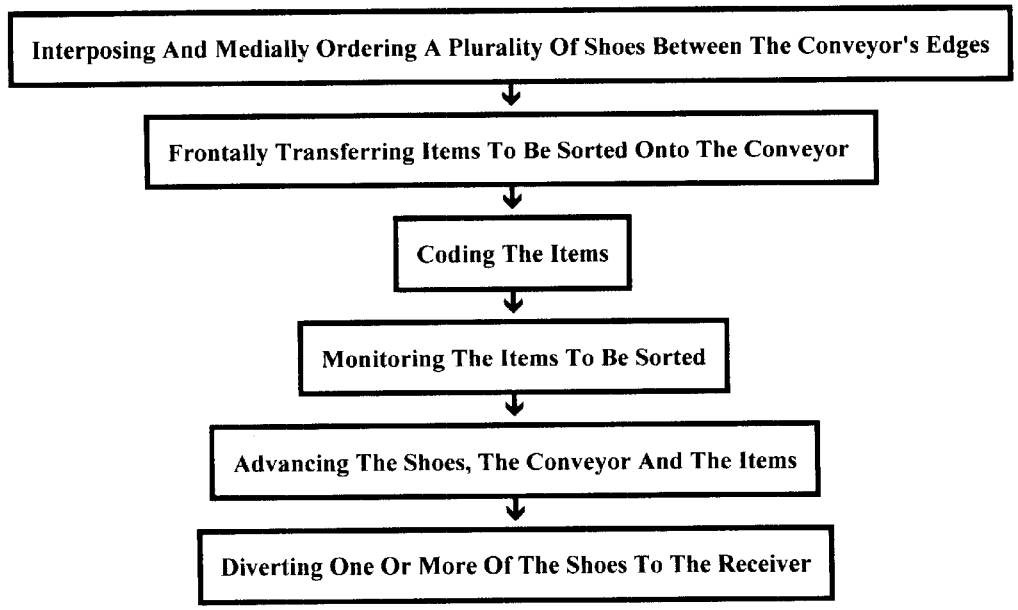
FIG. 8 is a flowing depiction of another method of the present invention.
Figure 9:
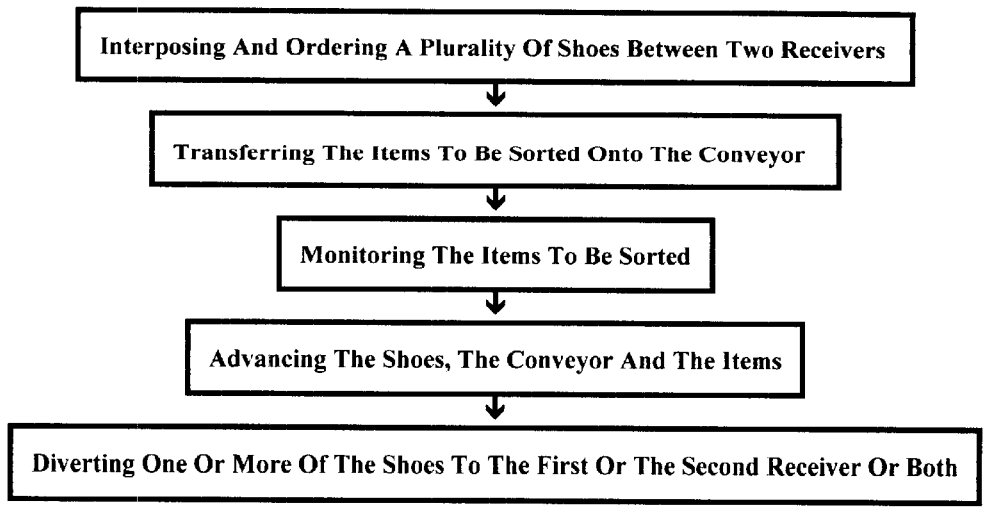
FIG. 9 is a fluid demonstration of still another method of the present invention.
Figure 10:
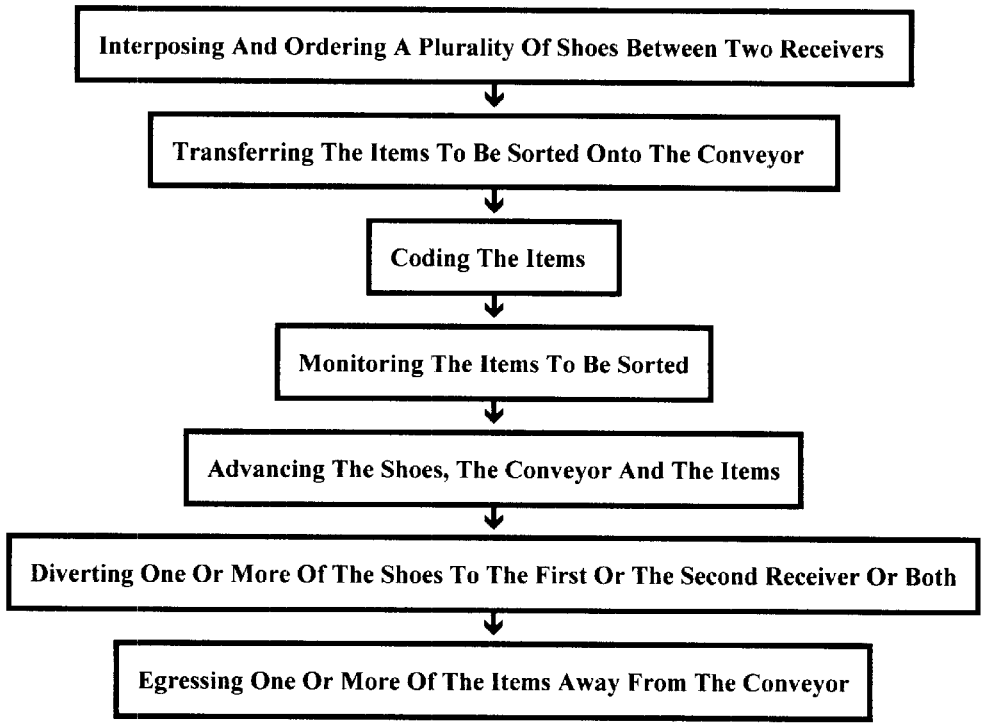
FIG. 10 is an exemplification of yet another method of the present invention.
Figure 11:
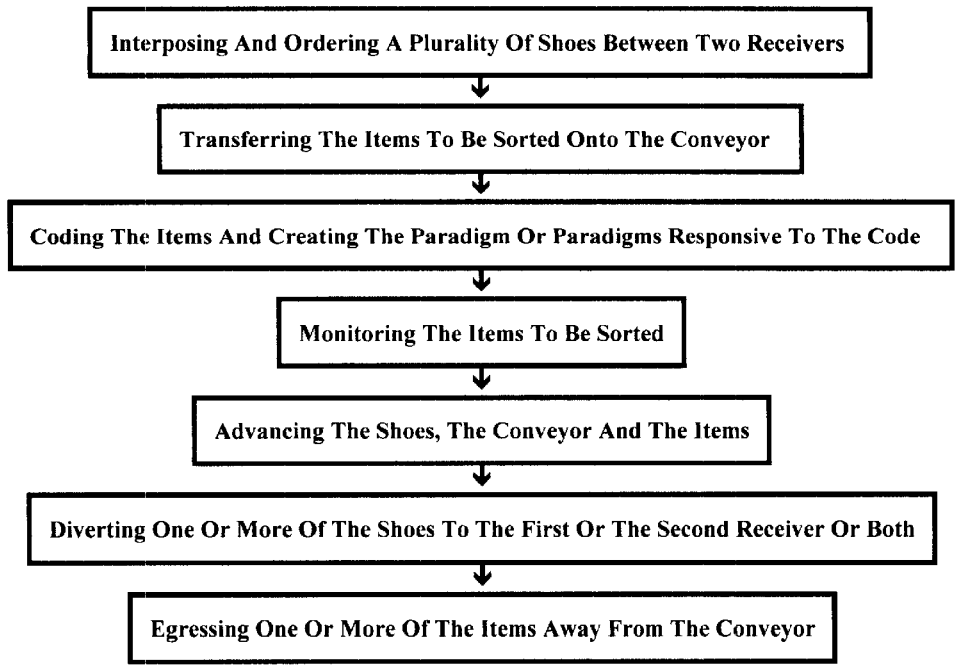
FIG. 11 is yet another depiction of another method of the present invention.
Figure 12:
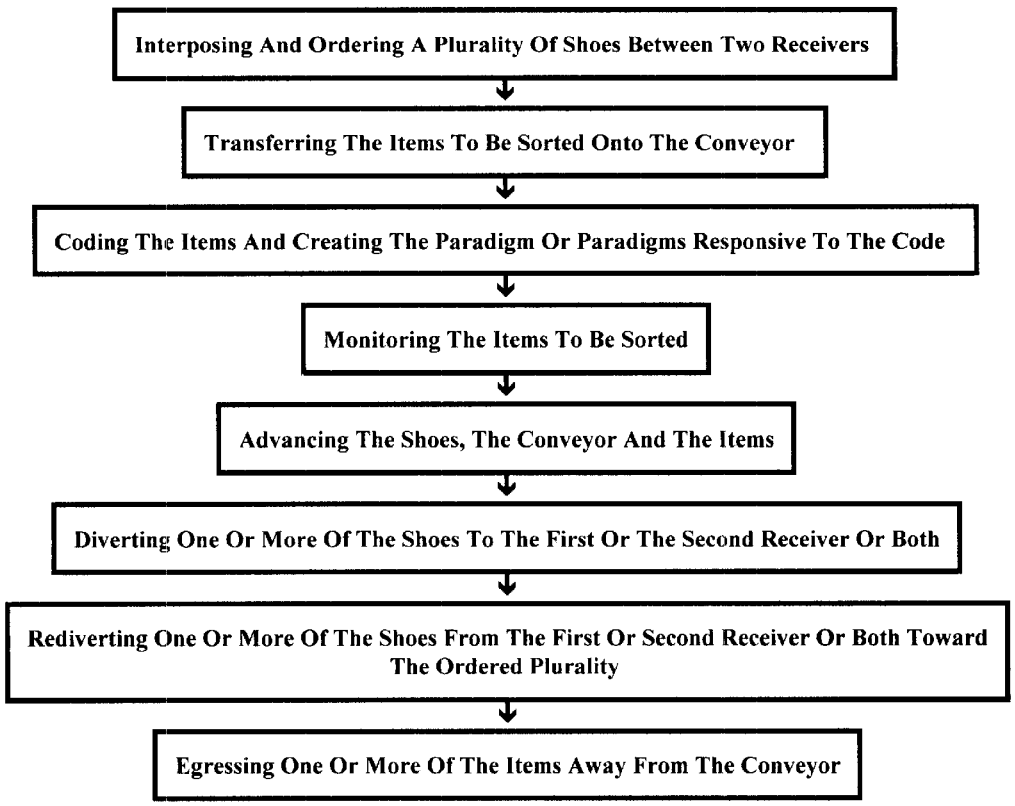
FIG. 12 is a portrayal of the steps of still another method of the present invention.
Figure 13:
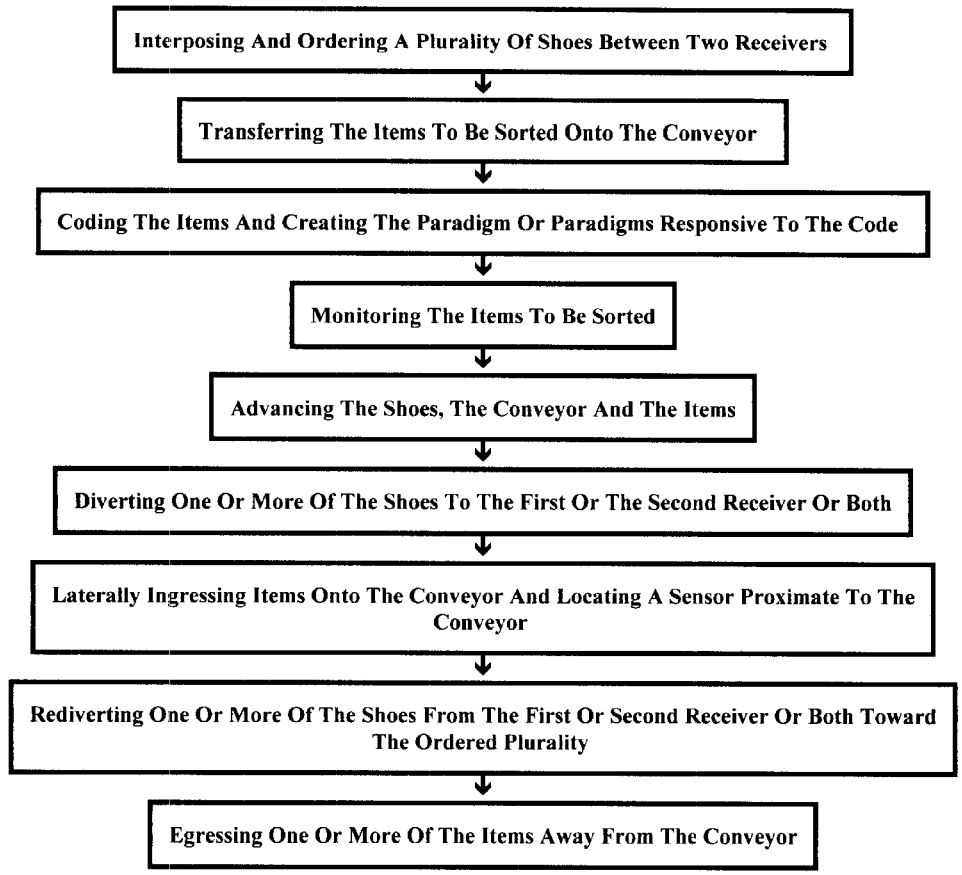
FIG. 13 is a representation of yet another method of the present invention.

FIGS. 7 and 8 disclose steps of practicing methods which incorporate medially interposing a plurality of shoes, shafts, rods or the like between the edges of the conveyor. Those shoes can be diverted toward a single receiver, and the single receiver can redivert the shoes back toward the medially interposed plurality. Practice of this particular embodiment can include egressing one or more items away from the conveyor.

FIGS. 9–13 enable the steps of practicing methods which interpose a plurality of shoes between two receivers. Diversion of the shoes, rods, shafts or the like, either singularly or in series, toward either receiver or both is possible. And either one of the receivers or both can redirect the shoes back toward the interposed plurality. Practice of this specific embodiment can include laterally ingressing items onto the conveyor as well as egressing items away from the conveyor. Steps of this embodiment provide for the simultaneous or alternating sortation of one or two lines of items.

Figure 14:
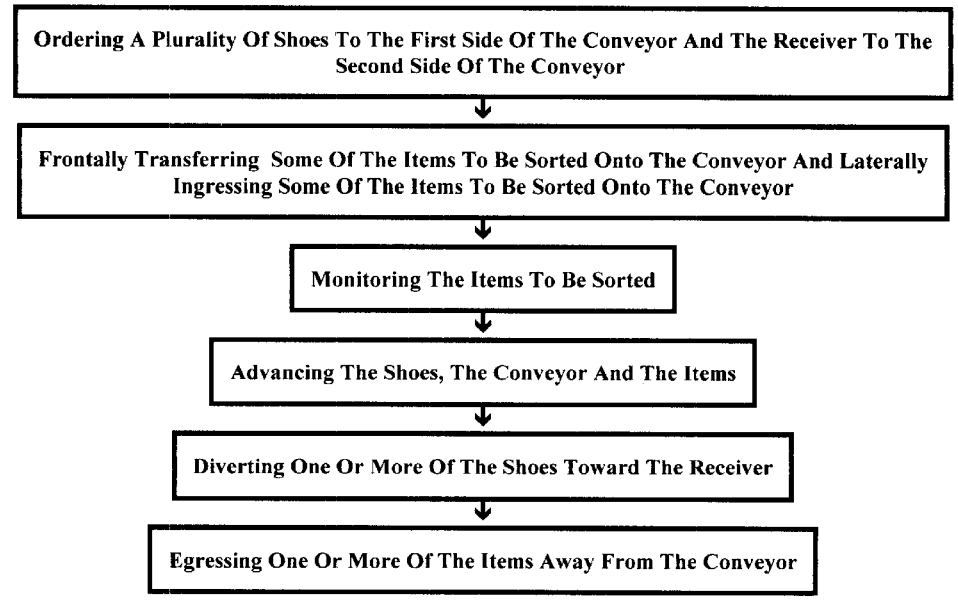
FIG. 14 is a depiction of yet still another method of the present invention.
Figure 15:
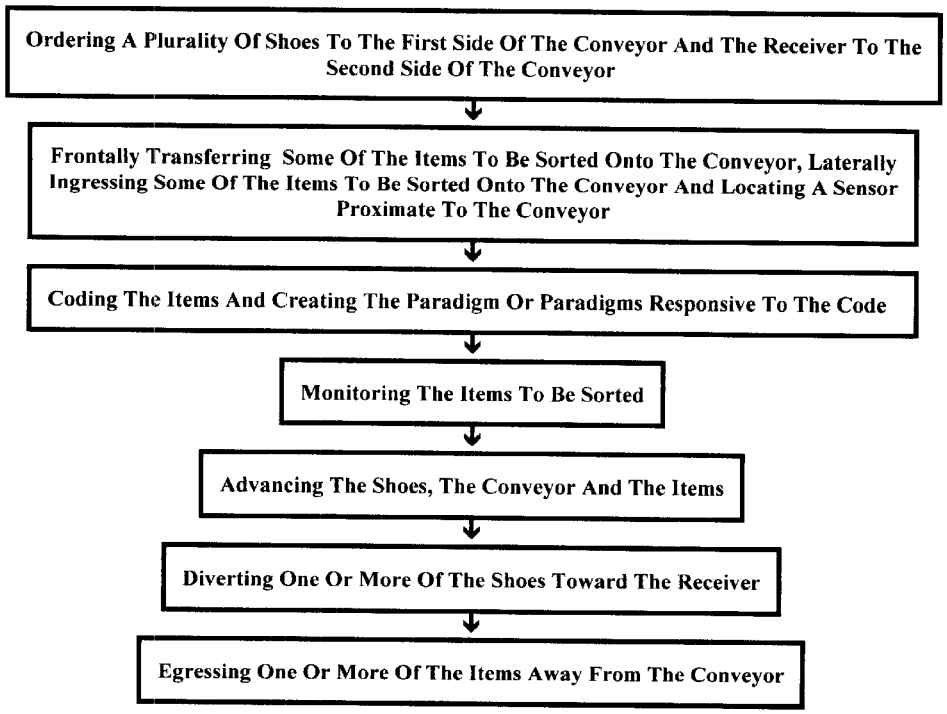
FIG. 15 is an exemplification of still another method of the present invention.
Figure 16:
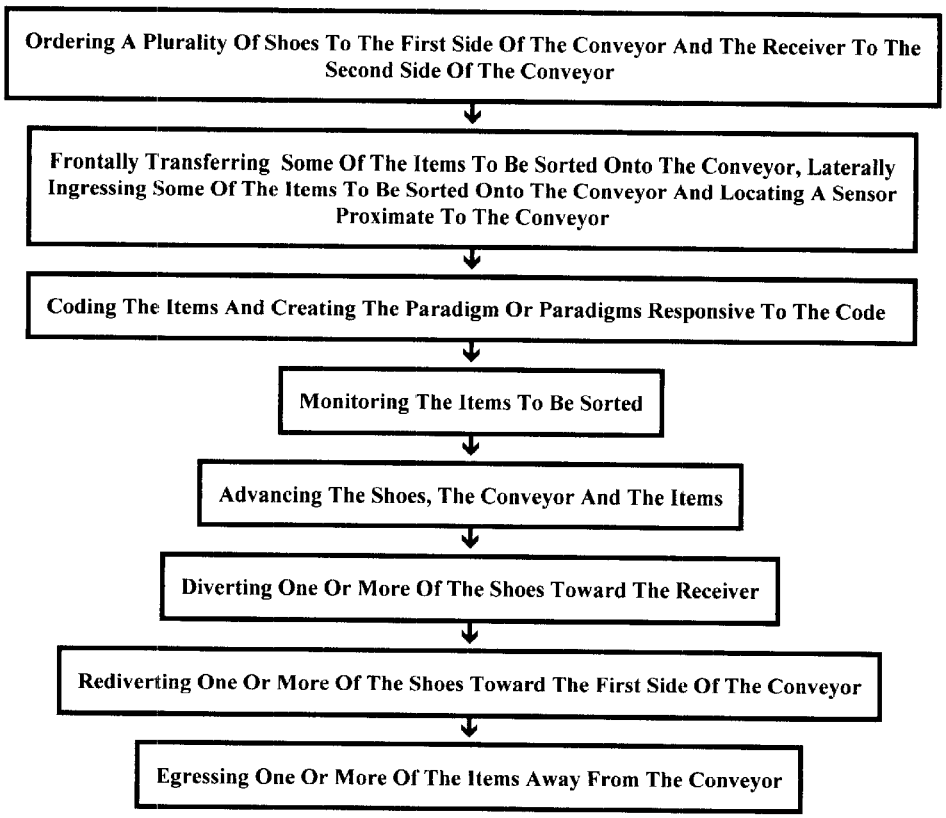
FIG. 16 is a delineation of another method of the present invention.
Figure 17:
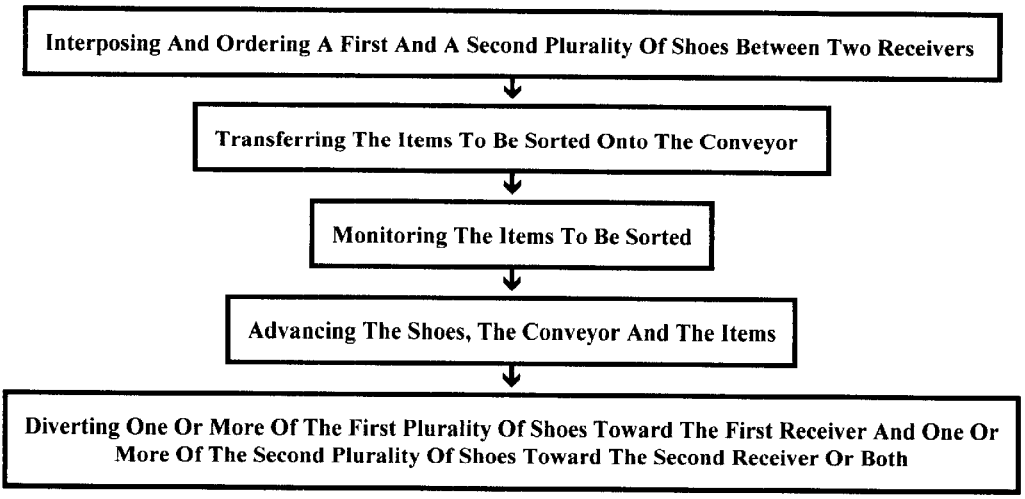
FIG. 17 is a representation of another method of the present invention.
Figure 18:
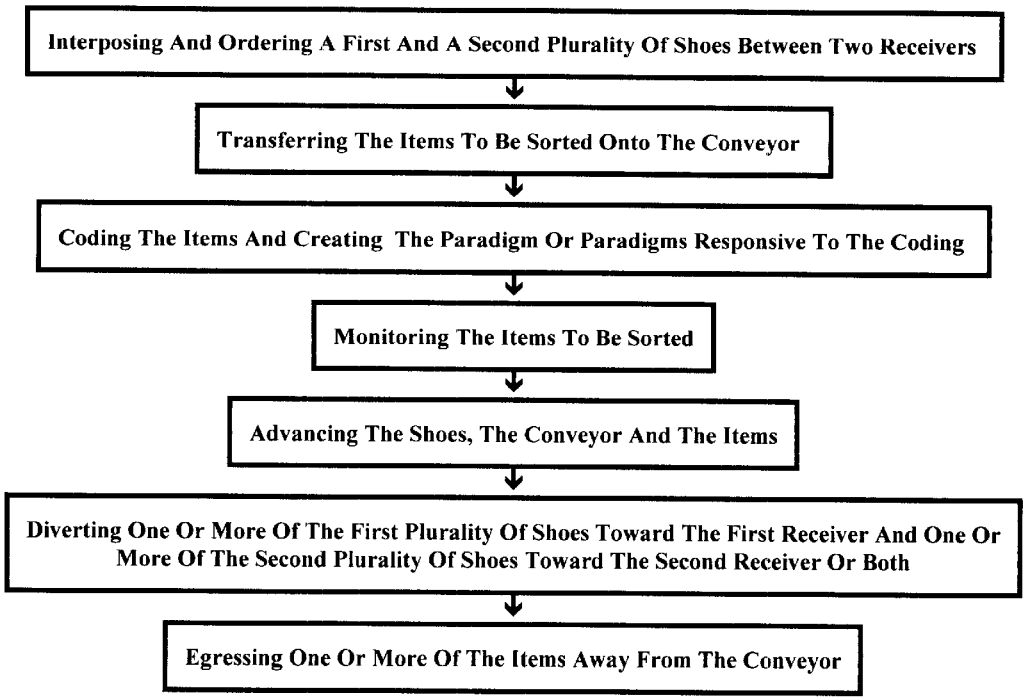
FIG. 18 is an exemplification of yet another method of the present invention.
Figure 19:
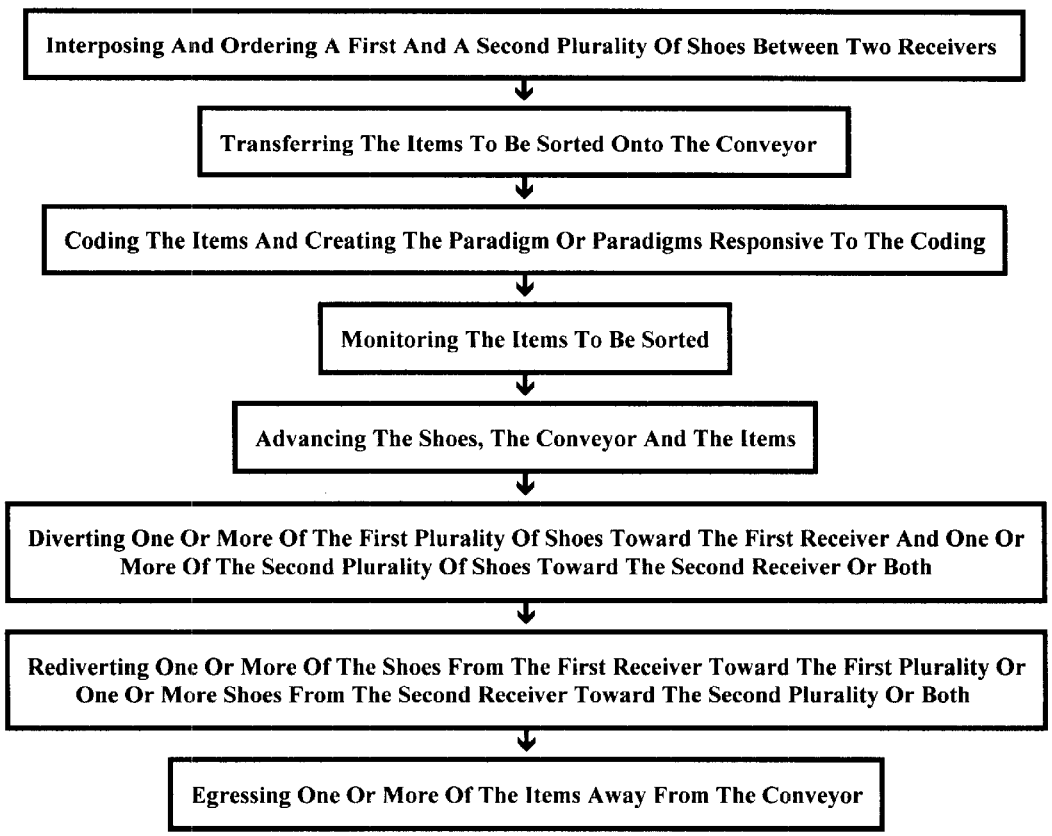
FIG. 19 is yet another representation of a method of the present invention.
Figure 20:
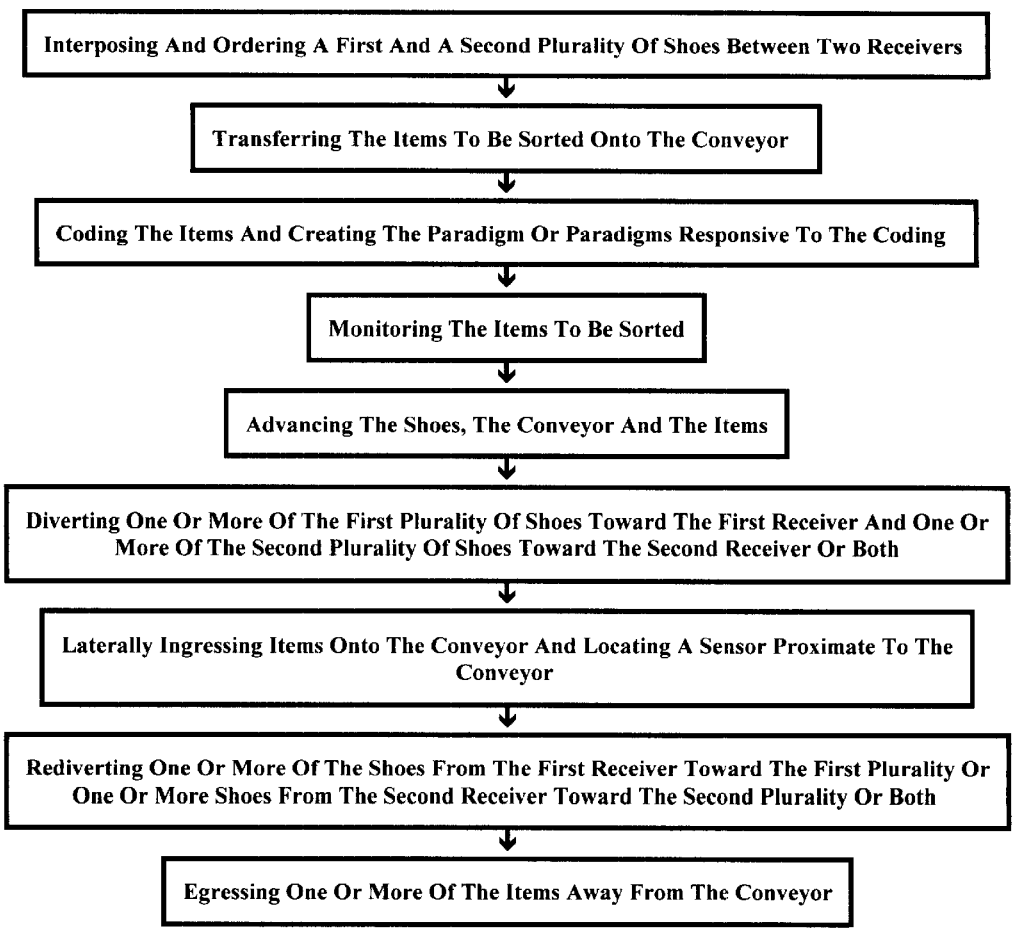
FIG. 20 is another depiction of the method of the present invention.

FIGS. 14–16 disclose steps of practicing methods which utilize one laterally justified plurality of shoes, shafts, rods or the like positioned near a first edge of the conveyor and a receiver placed near the opposite edge of the conveyor. Along with front loading, items to be sorted are also laterally ingressed onto the conveyor. This particular embodiment can divert shoes, either singularly or in series, from the plurality to the receiver while redirection of the shoes from the receiver toward the plurality is also possible.

FIGS. 17–20 enable the steps of practicing methods which interpose two pluralities of shoes, shafts, rods or the like between two receivers. Each plurality of shoes and its corresponding receiver creates a distinct side of the conveyor that allows for the sortation of two distinct paths of items. Either singularly or in series, shoes are diverted from one of the interposed pluralities to its corresponding receiver. Redirection of the diverted shoes back to the interposed plurality is also within the scope of this embodiment. Practice of this specific embodiment can include laterally ingressing items onto the conveyor as well as egressing items away from the conveyor.

Having disclosed the invention as required by Title 35 of the United States Code, Applicant now prays respectfully that Letters Patent be granted for his invention in accordance with the scope of the claims appended hereto.

What is claimed is:

1. A sorter for sorting a first and a second line of items, comprising:
   a) a base;
   b) a conveyor having a first edge and a second edge;
   c) a drive;
   d) a first receiver proximate to said first edge and a second receiver proximate to said second edge;
   e) a first plurality of shoes substantially parallel to said first line of items and located inward from said first line of items outlining a first path;
   f) a second plurality of shoes positioned between said first plurality of shoes and said second line of items;
   g) a first diverter and a second diverter; and
   h) a first controller for said first diverter and a second controller for said second diverter.

2. A method of sorting a plurality of items, comprising the steps of:
   a) ordering a first plurality of shoes and a second plurality of shoes between:
      i) a first line of said plurality of items and a second line of said plurality of items; and
      ii) a first receiver and a second receiver, wherein said first plurality of shoes and said second plurality of shoes are substantially parallel;
   b) transferring one or more of said plurality of items to be sorted to a conveyor;
   c) advancing one or more of said plurality of items, said conveyor and said plurality of shoes;
   d) monitoring one or more of said plurality of items to be sorted; and
   e) activating a first diverter to cause one or more of said plurality of shoes to be directed toward said first receiver or a second diverter to cause one or more of said plurality of shoes to be directed toward said second receiver or both.

3. A sorter, comprising:
   a) a base;
   b) a conveyor for conveying a first line of items and a second line of items, wherein said first line items are spaced laterally from said second line items, including:
      i) a first edge;
      ii) a second edge; and
      iii) a centerline between said first edge and said second edge;
   c) a drive;
   d) a first receiver proximate to said first edge;
   e) a second receiver proximate to said second edge;
   f) a first plurality of shoes positioned near said centerline and interposed between said first line and said second line of items outlining a first pathway for said first plurality of shoes;
   g) a second plurality of shoes positioned between said first line and second line of items outlining a second pathway for said second plurality of shoes;
   h) a first diverter;
   i) a second diverter;
   j) a first controller for said first diverter; and
   k) a second controller for said second diverter.

4. The invention of claim 3 wherein said first controller further comprises a first predetermined paradigm for activating or deactivating said first diverter.

5. The invention of claim 4 wherein said second controller further includes said first predetermined paradigm or a second predetermined paradigm for activating or deactivating said second diverter.

6. The invention of claim 5 wherein said first or said second predetermined paradigm or both respond to a code located about an item to be sorted.

7. The invention of claim 6 wherein:
   a) said first receiver further comprises a first rediverter; and
   b) second receiver further comprises a second rediverter.

8. The invention of claim 7 further comprising a sensor proximate to said conveyor.

9. A method of sorting a first line and a second line of a plurality of items comprising the steps of:
   a) ordering a first plurality of shoes and a second plurality of shoes between said first line of said plurality of items and said second line of said plurality of items, wherein said first line of items and said second line of items are spaced laterally from each other;
   b) transferring one or more of said plurality of items to be sorted to a conveyor carrying said first line and said second line of said plurality of items;
   c) advancing one or more of said plurality of items, said conveyor and said plurality of shoes;
   d) monitoring one or more of said plurality of items to be sorted; and
   e) activating a first diverter to cause one or more of said first plurality of shoes to be directed toward a first receiver or a second diverter to cause one or more of said plurality of shoes to be directed toward a second receiver or both.

10. The invention of claim 9 further comprising the step of creating a paradigm responsive to codes about said plurality of items for controlling activation or deactivation of said first diverter or said second diverter or both.

11. The invention of claim 10 further comprising the step of rediverting one or more of said plurality of shoes from said first receiver toward said first line of said plurality of items.

12. The invention of claim 11 further comprising the steps of rediverting one or more of said plurality of shoes from said second receiver toward said second line of said plurality of items.

13. A sorter for sorting a first line and a second line of a plurality of items, comprising:
   a) a base;
   b) a drive;
   c) a conveyor for conveying said first line of said plurality of items and said second line of said plurality of items, wherein said first line items are spaced laterally from said second line items, further including:
      i) a first edge;
      ii) a second edge; and
      iii) a centerline between said first edge and said second edge;
   d) a first receiver proximate to said first edge of said conveyor;

e) a second receiver proximate to said second edge of said conveyor;

f) a first plurality of shoes positioned between said first edge and said centerline and interposed between said first line of said plurality of items and said second line of said plurality of items outlining a first and undiverted pathway for said first plurality of shoes;

g) a second plurality of shoes positioned between said first line of said plurality of items and said second line of said plurality of items and substantially parallel to said first pathway for said first plurality of shoes outlining a second and undiverted pathway of said second plurality of shoes;

h) a first diverter aligned with said first pathway;

i) a second diverter aligned with said second pathway; and j) a controller for:
   i) said conveyor;
   ii) said first plurality of shoes; and
   iii) said second plurality of shoes.

14. The invention of claim 13 further comprising:
   a) a first crossover corresponding with said first diverter aligned with said first undiverted pathway for guiding any diverted first pathway shoe into said first receiver; and
   b) a second crossover corresponding with said second diverter aligned with said second undiverted pathway for guiding any diverted second pathway shoe into said second receiver.

15. The invention of claim 14 further comprising a predetermined paradigm.

16. The invention of claim 15 further comprising:
   a) more than one first pathway diverter and a corresponding crossover for each said first pathway diverter.

17. The invention of claim 16 further comprising:
   a) more than one second pathway diverter and a corresponding crossover for each said second pathway diverter.

18. The invention of claim 17 further comprising a front end sensor for detecting codes about said plurality of items.

19. A method of sorting simultaneously a first line and a second line of a plurality of items, comprising the steps of:
   a) mounting a conveyor to a base for conveying said first line items spaced laterally from said second line items, wherein said conveyor further comprises:
      i) a plurality of slats having slots there between;
      ii) a first lateral edge;
      iii) a second lateral edge; and
      iv) a centerline between said first lateral edge and said second lateral edge;
   b) positioning a first shoe receiver proximate said first lateral edge;
   c) positioning a second shoe receiver proximate said second lateral edge;
   d) ordering a first plurality of shoes between said first lateral edge and said centerline and simultaneously interposing said first plurality of shoes between said first line and said second line of said plurality of items, thereby outlining a first pathway for said first plurality of shoes;
   e) situating sequentially a first plurality of diverters communicating with said first pathway for diverting, singularly or serially, one or more of said first plurality of shoes toward said first shoe receiver;
   f) guiding any diverted first pathway shoe into said first shoe receiver;
   g) interposing a second plurality of shoes between said first line and said second line of said plurality of items, thereby outlining a second pathway for said second plurality of shoes;
   h) situating a second diverter communicating with said second pathway for diverting, singularly or serially, one or more of said second plurality of shoes toward said second shoe receiver;
   i) guiding any diverted second pathway shoe into second shoe receiver;
   j) front end loading said first line items onto said conveyor;
   k) front end loading said second line items onto said conveyor;
   n) monitoring front end loading; and
   o) controlling advancement of and offloading of said first line and said second line items.

20. The method of claim 19 further comprising the steps of:
   a) repositioning any shoes advancing in said first shoe receiver into said first shoe pathway, prior to completing a conveying cycle for said first plurality of said shoes; and
   b) repositioning any shoes advancing in said second shoe receiver into said second shoe pathway, prior to completing said conveying cycle for said second plurality of shoes.

21. The method of claim 20 further comprising the steps of:
   a) singulating said first line items prior to front end loading;
   b) singulating said second line prior to front end loading.

22. The method of claim 21 further comprising the step of situating sequentially a plurality of second pathway diverters for diverting, singularly or serially, one or more of said second plurality of shoes toward said second shoe receiver.

* * * * *